(12) United States Patent
Tang et al.

(10) Patent No.: US 10,545,932 B2
(45) Date of Patent: Jan. 28, 2020

(54) METHODS AND SYSTEMS FOR DATA CLEANING

(71) Applicant: Qatar Foundation, Doha (QA)

(72) Inventors: Nan Tang, Doha (QA); Jiannan Wang, Doha (QA)

(73) Assignee: Qatar Foundation, Doha (QA)

( * ) Notice: Subject to any disclaimer, the term of this patent is extended or adjusted under 35 U.S.C. 154(b) by 558 days.

(21) Appl. No.: 14/765,985

(22) PCT Filed: Feb. 7, 2014

(86) PCT No.: PCT/EP2014/052494
§ 371 (c)(1),
(2) Date: Aug. 5, 2015

(87) PCT Pub. No.: WO2014/122295
PCT Pub. Date: Aug. 14, 2014

(65) Prior Publication Data
US 2015/0379051 A1    Dec. 31, 2015

(30) Foreign Application Priority Data

Feb. 7, 2013 (WO) ................. PCT/EP2013/052476
Feb. 12, 2013 (GB) ................................... 1302415.3

(51) Int. Cl.
*G06F 16/215* (2019.01)
*G06F 16/21* (2019.01)

(52) U.S. Cl.
CPC .......... *G06F 16/215* (2019.01); *G06F 16/217* (2019.01)

(58) Field of Classification Search
CPC ......... G06F 17/30067; G06F 17/30008; G06F 17/30887; G06F 16/215
USPC ................. 707/691, 692; 715/205, 234, 771
See application file for complete search history.

(56) References Cited

U.S. PATENT DOCUMENTS

| 5,770,841 A * | 6/1998 | Moed .................. B07C 3/00 235/375 |
| 5,918,232 A * | 6/1999 | Pouschine ......... G06F 17/30592 |
| 6,131,101 A * | 10/2000 | Maitino .............. G06Q 10/107 |
| 6,965,888 B1 | 11/2005 | Cesare et al. |
| 7,653,753 B2 | 1/2010 | Chen et al. |
| 8,515,863 B1 * | 8/2013 | Morejon ............... G06Q 40/02 705/38 |

(Continued)

OTHER PUBLICATIONS

Wei, Weijie, et al. "A data cleaning method based on association rules." International Conference on Intelligent Systems and Knowledge Engineering 2007. Atlantis Press, 2007. (Year: 2007).*

(Continued)

*Primary Examiner* — William Spieler
(74) *Attorney, Agent, or Firm* — Martin & Ferraro, LLP

(57) ABSTRACT

A method for cleaning data stored in a database, the method comprising providing a set of fixing rules. Each fixing rule incorporates a set of attribute values that capture an error in a plurality of semantically related attribute values, and a deterministic correction which is operable to replace one of the set of attribute values with a correct attribute value to correct the error. The method further comprises comparing at least two of the fixing rules with one another to check that the error correction carried out by one fixing rule is consistent with the error correction carried out by another fixing rule.

12 Claims, 7 Drawing Sheets

Figure 11:
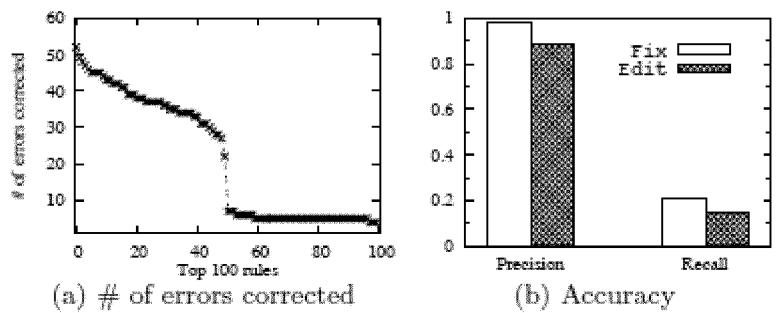

| | name | country | capital | city | conf |
|---|---|---|---|---|---|
| $r_1$: | George | China | Beijing | Beijing | SIGMOD |
| $r_2$: | Ian | China | Shanghai (Beijing) | Hongkong (Shanghai) | ICDE |
| $r_3$: | Peter | China (Japan) | Tokyo | Tokyo | ICDE |
| $r_4$: | Mike | Canada | Toronto (Ottawa) | Toronto | VLDB |

(56) References Cited

U.S. PATENT DOCUMENTS

| | | | |
|---|---|---|---|
| 2002/0103834 A1 | 8/2002 | Thompson et al. | |
| 2003/0023593 A1* | 1/2003 | Schmidt | G06F 17/30539 |
| 2003/0088481 A1 | 5/2003 | Elias | |
| 2003/0110192 A1* | 6/2003 | Valente | G06F 21/50 715/234 |
| 2003/0131337 A1* | 7/2003 | Perumainar | G06F 8/33 717/100 |
| 2004/0024790 A1* | 2/2004 | Everett | G06F 17/30595 |
| 2004/0133443 A1* | 7/2004 | Payne | G06Q 50/32 705/406 |
| 2004/0148284 A1* | 7/2004 | Baker | G06F 17/276 |
| 2004/0267611 A1* | 12/2004 | Hoerenz | G06Q 10/0637 705/14.13 |
| 2004/0267760 A1* | 12/2004 | Brundage | G06F 17/30923 |
| 2005/0022115 A1* | 1/2005 | Baumgartner | G06F 17/30911 715/205 |
| 2006/0195460 A1* | 8/2006 | Nori | G06F 17/3056 |
| 2006/0238919 A1* | 10/2006 | Bradley | G06F 16/215 360/128 |
| 2009/0006282 A1 | 1/2009 | Ann et al. | |
| 2009/0055206 A1* | 2/2009 | Orbke | G06Q 10/08 705/1.1 |
| 2010/0250596 A1* | 9/2010 | Fan | G06F 17/30303 707/776 |
| 2010/0318499 A1* | 12/2010 | Arasu | G06F 16/24556 707/693 |
| 2011/0055172 A1* | 3/2011 | Tan | G06F 17/30241 707/692 |
| 2011/0138312 A1* | 6/2011 | Yeh | G06F 17/30539 715/771 |
| 2012/0197868 A1* | 8/2012 | Fauser | G06F 17/30286 707/714 |
| 2012/0296879 A1 | 11/2012 | Yakout et al. | |
| 2014/0222722 A1* | 8/2014 | Varma | G06N 20/00 706/12 |
| 2016/0004743 A1 | 1/2016 | Tang et al. | |
| 2016/0103867 A1* | 4/2016 | Papotti | G06F 17/30303 707/690 |

OTHER PUBLICATIONS

Diallo, Thierno, Jean-Marc Petit, and Sylvie Servigne. "Discovering editing rules for data cleaning." Proceedings of AQB conference. 2012. (Year: 2012).*

K. Hima Prasad et al., "Data Cleansing Techniques for Large Enterprise Datasets," 2011 Annual SRII Global Conference, 2011 IEEE, ISBN 978-0-7695-4371-0/11, DOI 10.1109/SRII.2011.26, pp. 135-144, 10 pages.

Muller, Heiko, et al.; "Problems, Methods, and Challenges in Comprehensive Data Cleansing;" 2003; pp. 1-23.

Wenfei Fan et al., "Towards certain fixes with editing rules and master data," The VLDB Journal, The International Journal on Very Large Data Bases, Springer, Berlin, DE, vol. 21, No. 2, Oct. 30, 2011, pp. 213-238, 26 pages.

Arenas et al., "Consistent Query Answers in Inconsistent Databases," PODS '99 Philadelphia PA, ACM 1999, pp. 68-79, May 1999, 12 pgs.

Bertossi et al., "Data Cleaning and Query Answering with Matching Dependencies and Matching Functions," ICDT 2011, pp. 268-279, Mar. 21-23, 2011, 12 pgs.

Beskales et al., "Modeling and Querying Possible Repairs in Duplicate Detection," VLDB '09, pp. 598-609, Aug. 24-28, 2009, 12 pgs.

Beskales et al., "Sampling the Repairs of Functional Dependency Violations under Hard Constraints," Proceedings of the VLDB Endowment, vol. 3, No. 1, pp. 197-207, Sep. 13-17, 2010, 11 pgs.

Bohannon et al., "A Cost-Based Model and Effective Heuristic for Repairing Constraints by Value Modification," SIGMOD 2005, pp. 143-154, Jun. 14-16, 2005, 12 pgs.

Bravo et al., "Extending Dependencies with Conditions," VLDB '07, pp. 243-254, Sep. 23-28, 2007, 12 pgs.

Chomicki et al., "Minimal-Change Integrity Maintenance Using Tuple Deletions," pp. 1-42, Oct. 20, 2004, 42 pgs.

Chu et al., "Holistic Data Cleaning: Putting Violations Into Context," IEEE 29th International Conference on Data Engineering (ICDE), 2013, Mar. 2013, 12 pgs.

Cong et al., "Improving Data Quality: Consistency and Accuracy," VLDB '07, pp. 315-326, Sep. 23-28, 2007, 12 pgs.

Fan, Wenfei, et al., "Conditional Functional Dependencies for Capturing Data Inconsistencies," ACM Transactions on Database Systems, vol. 33, No. 2, Article 6, Jun. 2008, 48 pgs.

Fan, Wenfei, "Dependencies Revisited for Improving Data Quality," PODS'08, pp. 159-170, Jun. 9-12, 2008, 12 pgs.

Fan, Wenfei, et al., "Interaction between Record Matching and Data Repairing," SIGMOD'11, pp. 469-480, Jun. 12-16, 2011, 12 pgs.

Fan, Wenfei, et al., "Reasoning about Record Matching Rules," VLDB '09, pp. 407-418, Aug. 24-28, 2009, 12 pgs.

Fellegi et al., "A Systematic Approach to Automatic Edit and Imputation," Journal of the American Statistical Association, vol. 71, No. 353, pp. 17-35, Mar. 1976, 20 pgs.

Geerts et al., "The LLUNATIC Data-Cleaning Framework," Proceedings of the VLDB Endowment, vol. 6, No. 9, pp. 625-636, Aug. 26-30, 2013, 12 pgs.

Herzog et al., "Data Quality and Record Linkage Techniques," Springer, May 2007, 241 pgs.

Kolahi et al., "On Approximating Optimum Repairs for Functional Dependency Violations," ICDT 2009, pp. 53-62, Mar. 23-25, 2009, 10 pgs.

Mayfield et al., "ERACER: A Database Approach for Statistical Inference and Data Cleaning," SIGMOD'10, pp. 75-86, Jun. 6-11, 2010, 12 pgs.

Naumann et al., "Data Fusion in Three Steps: Resolving Inconsistencies at Schema-, Tuple-, and Value-level," Bulletin of the IEEE Computer Society Technical Committee on Data Engineering, pp. 1-11, Jan. 2006, 11 pgs.

Raman et al., "Potter's Wheel: An Interactive Data Cleaning System," Proceedings of the 27th VLDB Conference, Roma, Italy, Sep. 2001, 10 pgs.

Singh et al., "Learning Semantic String Transformations from Examples," Proceedings of the VLDB Endowment, vol. 5, No. 8, pp. 740-751, Aug. 27-31, 2012, 12 pgs.

Wijsen, "Database Repairing Using Updates," ACM Transactions on Database Systems, vol. 30, No. 3, Sep. 2005, pp. 722-768, 47 pgs.

Yakout et al., "Guided Data Repair," Proceedings of the VLDB Endowment vol. 4, No. 5, pp. 279-289, Aug. 29-Sep. 3, 2011, 11 pgs.

* cited by examiner

|       | name   | country          | capital              | city                  | conf   |
|-------|--------|------------------|----------------------|-----------------------|--------|
| $r_1$: | George | China            | Beijing              | Beijing               | SIGMOD |
| $r_2$: | Ian    | China            | Shanghai (Beijing)   | Hongkong (Shanghai)   | ICDE   |
| $r_3$: | Peter  | China (Japan)    | Tokyo                | Tokyo                 | ICDE   |
| $r_4$: | Mike   | Canada           | Toronto (Ottawa)     | Toronto               | VLDB   |

Figure 1

|       | country | capital |
|-------|---------|---------|
| $s_1$: | China   | Beijing |
| $s_2$: | Canada  | Ottawa  |
| $s_3$: | Japan   | Tokyo   |

Figure 2

| | country | {capital$^-$} | capital$^+$ |
|---|---|---|---|
| $\varphi_1$: | China | Shanghai, Hongkong | Beijing |

| | country | {capital$^-$} | capital$^+$ |
|---|---|---|---|
| $\varphi_2$: | Canada | Toronto | Ottawa |

Figure 3

Figure 4

```
Algorithm isConsist^r
Input:   a set Σ of fixing rules.
Output:  true (consistent) or false (inconsistent).
1.  for any two distinct φ_i, φ_j ∈ Σ do
2.     if X_i ∩ X_j = ∅ or t_{p_i}[X_i ∩ X_j] = t_{p_j}[X_i ∩ X_j] do
3.        if B_i = B_j do
4.           if T^-_{p_i}[B_i] ∩ T^-_{p_j}[B_i] ≠ ∅ and t^+_{p_i}[B_i] ≠ t^+_{p_j}[B_i] do
5.              return false;
6.        elseif B_i ∈ X_j and B_j ∉ X_i and t_{p_j}[B_i] ∈ T^-_{p_i}[B_i]
7.           return false;
8.        elseif B_j ∈ X_i and B_i ∉ X_j and t_{p_i}[B_j] ∈ T^-_{p_j}[B_j]
9.           return false;
10.       elseif B_j ∈ X_i and B_i ∈ X_j and t_{p_i}[B_j] ∈ T^-_{p_j}[B_j]
             and t_{p_j}[B_i] ∈ T^-_{p_i}[B_i]
11.          return false;
12. return true;
```

Figure 5

|  | country | {capital⁻} | capital⁺ |
|---|---|---|---|
| $\varphi'_1$: | China | Shanghai<br>Hongkong<br>Tokyo | Beijing |

|  | capital | city | conf | {country⁻} | country⁺ |
|---|---|---|---|---|---|
| $\varphi_3$: | Tokyo | Tokyo | ICDE | China | Japan |

Figure 6

Algorithm cRepair
Input: a tuple $t$, a set $\Sigma$ of consistent fixing rules.
Output: a repaired tuple $t'$.

1. $\mathcal{A} := \emptyset$; $\Gamma := \Sigma$; $t' := t$; updated $:= true$;
2. while updated do
3.   updated $:= false$;
4.   for each $\varphi \in \Gamma$ do
5.     if $t'$ matches $\varphi$ and $B_\varphi \notin \mathcal{A}$ then
6.       $t'[B_\varphi] := t_p^+[B_\varphi]$ (by applying $\varphi$);
7.       $\mathcal{A} := \mathcal{A} \cup X_\varphi \cup \{B_\varphi\}$; $\Gamma := \Gamma \setminus \{\varphi\}$; updated $:= true$;
8. return $t'$;

Figure 7

Algorithm IRepair
Input: tuple $t$ of $R$, consistent $\Sigma$, inverted lists $\mathcal{I}$.
Output: a repaired tuple $t'$.

1. $\mathcal{A} := \emptyset$; $\Gamma := \emptyset$; $t' := t$;
2. for each $\varphi \in \Sigma$ do $c(\varphi) := 0$;
3. for each $A \in R$ do
4.   for each $\varphi$ in $\mathcal{I}(A, t[A])$ do
5.     $c(\varphi) := c(\varphi) + 1$;
6. for each $\varphi \in \Sigma$ do
7.   if $c(\varphi) = |X_\varphi|$ then $\Gamma := \Gamma \cup \{\varphi\}$;
8. while $\Gamma \neq \emptyset$ do
9.   randomly pick $\varphi$ from $\Gamma$;
10.   if $t'$ matches $\varphi$ and $B_\varphi \notin \mathcal{A}$ then
11.     update $t'$ by applying $\varphi$ such that $t'[B_\varphi] = t_p^+[B_\varphi]$;
12.     $\mathcal{A} := \mathcal{A} \cup X_\varphi \cup \{B_\varphi\}$;
13.     for each $\varphi' \in \mathcal{I}(B_\varphi, t'[B_\varphi])$ do
14.       $c(\varphi') := c(\varphi') + 1$;
15.       if $c(\varphi') = |X_{\varphi'}|$ then $\Gamma := \Gamma \cup \{\varphi'\}$;
16.   $\Gamma := \Gamma \setminus \{\varphi\}$;
17. return $t'$;

Figure 8

| key | list |
|---|---|
| country, China | $\varphi_1$ |
| country, Canada | $\varphi_2$ |
| conf, ICDE | $\varphi_3, \varphi_4$ |
| capital, Tokyo | $\varphi_3$ |
| city, Tokyo | $\varphi_3$ |
| capital, Beijing | $\varphi_4$ |

(a) Inverted lists $r_1$: $\Gamma = \{\varphi_1\}$, $c(\varphi_1) = 1$
itr1: $r'_1 = r_1$, $\Gamma = \emptyset$ $r_2$: $\Gamma = \{\varphi_1\}$, $c(\varphi_1, \varphi_3, \varphi_4) = 1$;
itr1: $r'_2[\text{capital}] = $ Beijing
 $c(\varphi_3)=1$, $c(\varphi_4)=2$, $\Gamma=\{\varphi_4\}$;
itr2: $r'_2[\text{city}] = $ Shanghai, $\Gamma = \emptyset$ $r_3$: $\Gamma = \{\varphi_3\}$, $c(\varphi_3)=3$;
itr1: $r'_3[\text{country}] = $ Japan, $\Gamma = \emptyset$ $r_4$: $\Gamma = \{\varphi_2\}$, $c(\varphi_2)=1$;
itr1: $r'_4[\text{capital}] = $ Ottawa, $\Gamma = \emptyset$

Figure 9

FDs for HOSP
PN → HN, address1, address2, address3, city, state, zip,
        county, phn, ht, ho, es
phn → zip, city, state, address1, address2, address3
MC → MN, condition
PN, MC → stateAvg
state, MC → stateAvg

FDs for UIS
ssn → fname, minit, lname, stnum, stadd, apt, city, state, zip
fname, minit, lname → ssn, stnum, stadd, apt, city, state, zip
zip → state, city

Figure 10

METHODS AND SYSTEMS FOR DATA CLEANING

This is a National Phase Application under 35 USC 371 of PCT/EP2014/052494 filed Feb. 7, 2014 (published on Aug. 14, 2014 as WO 2014/122295); which claims priority to PCT/EP2013/052476 filed Feb. 7, 2013 (published on Aug. 14, 2014 as WO 2014/121839) and Great Britain Application No. 1302415.3 filed Feb. 12, 2013; all of which are incorporated by reference herein in their entirety.

The present invention relates to methods and systems for data cleaning and more particularly relates to methods and systems for repairing errors in attribute values in a database.

There are numerous known methods and systems for cleaning data in a database. The term "cleaning" is used herein to mean correcting or repairing errors in values or attribute values which are stored as information in a database.

The following examples illustrate the drawbacks of the state-of-the-art work in the area of data cleaning.

Consider a database D of travel records. The database is specified by the following schema:

travel (name,country,capital,city,conf)

Here a travel tuple specifies a person, identified by name, has travelled to conference (conf), held at the city of the country and its capital. Example instances of travel are shown in FIG. 1 of the accompanying drawings.

The following four techniques may be used to detect and repair errors in the database of FIG. 1.

(1) Integrity Constraints

A functional dependency (FD) is used to specify the consistency of travel data D as:

$\varphi_1$: travel([country]→[capital])

where $\varphi_1$ asserts that country uniquely determines capital.

The FD $\varphi_1$ detects that in the database in FIG. 1, the two tuples (r1,r2) violate $\varphi_1$, since they have the same country values but different capital values, so do (r1,r3) and (r2,r3). However, $\varphi_1$ does not tell us which attributes are wrong and what values they should be changed to.

Other constraints, such as conditional functional dependencies (CFDs) or denial constraints may also be introduced to detect various errors. However, these other constraints are also not able to repair data.

Using such integrity constraints, existing heuristic based approaches may choose any of the three values, Beijing, Shanghai, or Tokyo to update r1[capital]r3[capital].

(2) User Guided Repairs

It is known to clean data using repairs which are guided by users. Assuming that the three violations among tuples r1-r3 have been detected as in (1), a typical user guided repair raises a question to users such as: Which is the capital of China: Beijing, Shanghai, or Tokyo?

One can assume that the users pick Beijing as the capital of China. This corrects the erroneous value r2[capital], from Shanghai to Beijing. However, the error in r3 should be r3[country], which should be Japan instead of China. The response from the users is therefore not helpful to fix the error in r3. Worse still, the change prompted by the uses will introduce a new error as it changes r3[capital] from Tokyo to Beijing.

(3) Editing Rules

Editing rules can be used to capture and repair errors. Master data stores correct information about countries and their capitals. The schema of the master data is:

cap (country,capital).

A master relationship between the attributes in the data in FIG. 1 is shown in FIG. 2 of the accompanying drawings.

A conventional editing rule $\psi_1$ is defined on two relations (travel,cap) as:

$\psi_1$: ((country,country)→(capital,capital),tp1 [country]=( ))

The editing rule $\psi_1$ states that: for a tuple r in the travel database of FIG. 1, if r[country] is correct and it matches a tuple s in relation cap, r[capital] can be updated using the value s[capital] drawn from the master data cap.

For instance, to repair r2 in the database of FIG. 1, r2 is initially matched to s1 in the master data. Users are then asked to verify that r2[country] is indeed China, and the rule then updates r2[capital] to Beijing. Similarly, r4[capital] can be corrected to be Ottawa by using $\psi_1$ and s2 in Dm, if users verify that r4[country] is Canada. The case for r3 is more complicated since r3[country] is Japan and not China. Therefore, more effort is required to correct r3.

(4) Extract Transform Load (ETL) Rules

A typical task in an ETL rule is a lookup operation, assuming the presence of a dictionary (e.g., the master data Dm in FIG. 2). For each tuple r in D in the database of FIG. 1, assuming attribute country is correct, the rule will lookup Dm and update the attribute values of capital in D. In this case, the rule corrects r2[capital] (resp. r4[capital]) to Beijing (resp. Ottawa). However, the rule then introduces a new error also messes by changing the value of r3[capital] from Tokyo to Beijing, similar to the case (2) above.

The above four repair examples illustrate the following problems with such conventional techniques:

(a) Heuristic methods for repairing data based on integrity constraints do not guarantee to find correct fixes. Worse still, they may introduce new errors when trying to repair the data, as in case (1) above.
(b) It is reasonable to assume that users may provide correct answers to verify data. However, new errors can still be introduced by using user provided answers, such as in case (2) above.
(c) Master data (or a dictionary) that is guaranteed correct is a feasible repair option. However, it is prohibitively expensive to involve users for each data tuple correction (case (3)), or to ensure that certain columns are correct (case (4)).

There is therefore a need for improved data cleaning rules which seek to overcome the above problems.

According to one aspect of the present invention, there is provided, a method for cleaning data stored in a database, the method comprising providing a set of fixing rules, each fixing rule incorporating a set of attribute values that capture an error in a plurality of semantically related attribute values, and a deterministic correction which is operable to replace one of the set of attribute values with a correct attribute value to correct the error, wherein the method further comprises comparing at least two of the fixing rules with one another to check that the error correction carried out by one fixing rule is consistent with the error correction carried out by another fixing rule.

Preferably, the method comprises comparing all fixing rules in the set of fixing rules pairwise with one another.

Conveniently, the method comprises applying at least two of the fixing rules to a tuple of attribute values to check whether the at least two fixing rules apply different corrections to the tuple, thereby indicating that the at least two fixing rules are not consistent with one another.

Advantageously, the method comprises identifying a tuple of attribute values that satisfies two of the fixing rules and applying the two fixing rules to the tuple alternately in different orders to determine if the two fixing rules apply different error corrections to the tuple when the fixing rules are applied to the tuple in different orders, thereby indicating that the fixing rules are not consistent with one another.

Preferably, the method further comprises combining at least part of two inconsistent fixing rules with one another to produce one or more modified fixing rules which are consistent with one another.

Conveniently, the method comprises repeating the comparison between at least two of the fixing rules until the method identifies that all of the fixing rules in the set of fixing rules are consistent with one another.

Advantageously, the method comprises outputting at least two fixing rules that are not consistent with one another to a user so that the user can amend or delete at least one of the fixing rules to remove the inconsistency.

Preferably, the method further comprises applying at least one of the fixing rules to a plurality of tuples stored in a database to detect if at least one of the tuples comprises the respective set of attribute values that captures the error and, if the respective set of attribute values is detected, applying the deterministic correction to correct the error in the at least one tuple.

According to another aspect of the present invention, there is provided a method for providing a set of fixing rules, each fixing rule incorporating a set of attribute values that capture an error in a plurality of semantically related attribute values, and a deterministic correction which is operable to replace one of the set of attribute values with a correct attribute value to correct the error, wherein the method comprises applying at least one of the fixing rules to a plurality of tuples stored in a database to detect if at least one of the tuples comprises the respective set of attribute values that captures the error and, if the respective set of attribute values is detected, applying the deterministic correction to correct the error in the at least one tuple.

Preferably, the method comprises applying a plurality of the fixing rules to the tuples stored in the database, the method applying each fixing rule only once to a respective tuple.

Conveniently, the method comprises allocating an attribute to each tuple which indicates each fixing rule that has been applied to the tuple.

Advantageously, the method comprises incrementing at least one counter to record when a fixing rule is applied to a tuple.

Preferably, each counter is a hash counter which records the number of tuples that correspond to each fixing rule.

Conveniently, the method further comprises generating an inverted list of a plurality of fixing rules, the inverted list comprising the plurality of fixing rules indexed according to at least one attribute value of each respective fixing rule.

Advantageously, the method comprises generating the inverted list only once during the operation of the method.

Preferably, the fixing rule comprises at least one similarity operator which is operable to detect variants of attribute values.

Conveniently, the fixing rule is operable to use a wildcard attribute value in the set of attribute values.

Advantageously, the fixing rule is operable to detect the negation of an attribute value.

Preferably, the method comprises providing a plurality of fixing rules and applying at least one of the plurality of fixing rules to the database.

According to another aspect of the present invention, there is provided a system for cleaning data stored in a database, the system being operable to perform the method of any one of claims 1 to 19 defined hereinafter.

According to a further aspect of the present invention, there is provided a tangible computer readable medium storing instructions which, when executed, perform the method of any one of claims 1 to 19 defined hereinafter.

Figure 12:
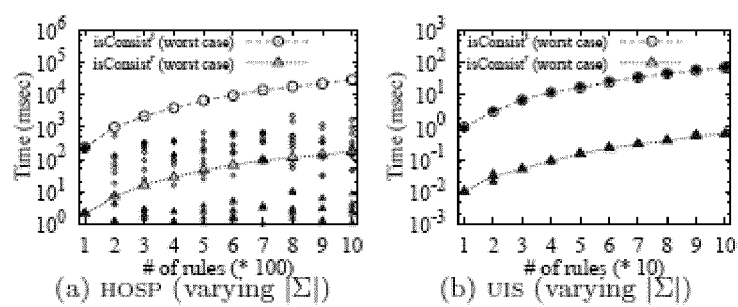
Figure 13:
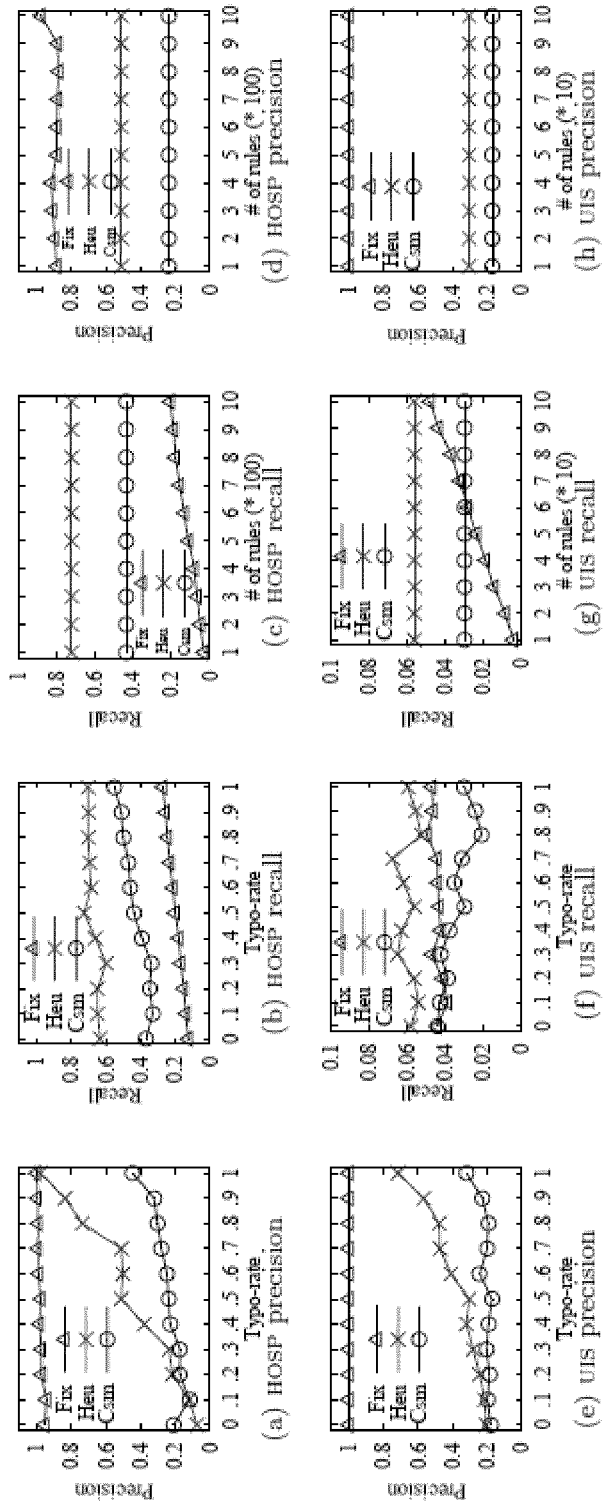
Figure 14:
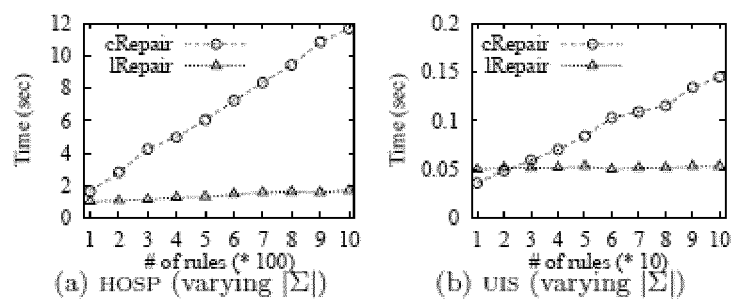

So that the present invention may be more readily understood, embodiments of the present invention will now be described, by way of example, with reference to the accompanying drawings, in which:

FIG. 1 is a table showing data in an example database D for an instance of schema Travel, FIG. 2 is a table showing data in an example database $D_m$ for an instance of schema Cap, FIG. 3 is a table showing an example of two fixing rules, FIG. 4 is a workflow diagram illustrating a method for ensuring the consistency in fixing rules, FIG. 5 is an algorithm for checking the consistency of fixing rules using rule characterisation, FIG. 6 is a table illustrating the resolution of conflicts in fixing rules, FIG. 7 is a chase-based repairing algorithm, FIG. 8 is a linear repairing algorithm, FIG. 9 is a diagram illustrating an example of the operation of a linear repairing algorithm, FIG. 10 is a table of example functional dependencies, FIGS. 11 (a-b) are graphs showing a comparison between errors corrected by fixing rules and conventional editing rules, FIGS. 12 (a-b) are graphs showing the efficiency of the fixing rule consistency check, FIGS. 13 (a-h) are graphs showing the accuracy of data repair, and FIGS. 14 (a-b) are graphs showing the efficiency of data repair.

2. FIXING RULES

An embodiment of the present invention utilises a set of data cleaning rules that not only detect errors from semantically related attribute values, but also automatically correct these errors without necessarily using any heuristics or interacting with users.

A data fixing rule of an embodiment of the invention contains an evidence pattern, a fact and a set of negative patterns. When a given tuple matches both the evidence pattern and the negative pattern of the rule, it is identified as an error, and the fixing rule will use the fact to correct the tuple.

This is possible by combining an evidence pattern, negative patterns and a fact into a single data fixing rule. The evidence pattern is a set of values with each value for one attribute. The negative patterns are a set of attribute values that capture an error on one attribute from semantically related values. The fact specifies a deterministic way to correct the error.

Consider a tuple t in relation travel, an example fixing rule φ1 is: for t, if its country is China and its capital is Shanghai or Hong Kong, t[capital] should be updated to Beijing.

This rule makes corrections to attribute t[capital], by taking the value from φ1, if t is identified by φ1 that current value t[capital] is wrong.

Another fixing rule φ2 is: for t in travel, if its country is Canada and its capital is Toronto, t[capital] should be updated to Ottawa.

Consider the database in FIG. 1.

Fixing rule φ1 detects that r2[capital] is wrong, since r2[country] is China, but r2[capital] is Shanghai. Rule φ1 will then update t2[capital] to Beijing.

Fixing rule φ2 detects that r4[capital] is wrong, and then corrects it to Ottawa.

Fixing rules φ1 and φ2 are summarised in FIG. 3 of the accompanying drawings.

After applying φ1-φ2, two errors (r2[capital], r4[capital]) have been fixed, while one remains (r3[capital]).

The above example indicates that:

(a) Fixing rules make dependable fixes, which do not introduce errors as in the heuristics rule in case (1) described above.

(b) Fixing rules do not claim to correct all errors, e.g., the combination (China, Tokyo). This combination may even be difficult for users to correct.

(c) Fixing rules neither require master data (3,4), or assume some attributes to be correct (2,4), nor interact with the users (2,3).

Fixing Rules—Syntax

A fixing rule φ defined on a relation R is of the form $(((X,tp[X]),(B,-Tp[B])) \rightarrow +tp[B])$ where:

1. X is a set of attributes in attr(R), and B is an attribute in attr(R)\X. Here, the symbol '\' represent set minus;

2. tp[X] is a set of attribute values in X, referred to as the evidence pattern. For each $A \in X$, tp[A] is a constant in dom(A);

3. −Tp[B] is a finite set of constant values in dom(B), referred to as the negative patterns of B; and 4. +tp[B] is a constant value in dom(B)\−Tp[B], referred to as the fact of B.

Intuitively, the evidence pattern tp[X] of X, together with the negative patterns −Tp[B] of B impose the condition to determine whether a tuple contains an error on attribute B, and the fact +tp[B] of B indicates how to correct the error on attribute B.

Note that the above condition 4 enforces that the correct value (i.e., the fact) is different from any known wrong values (i.e., negative patterns).

A tuple t of R matches a rule φ: $(((X,tp[X]),(B,-Tp[B])) \rightarrow +tp[B])$, if (i) t[X]=Tp[X], and (ii) t[B]∈−Tp[B].

Consider the fixing rules described in the above example. The rules can be formally expressed as follows:

φ1:  ((([country],[China]),(capital,{Shanghai,Hong Kong}))→Beijing)

φ2:  ((([country],[Canada]),(capital,{Toronto}))→Ottawa)

In both φ1 and φ2, X consists of country, B is capital. The pattern of φ1 states that, for a tuple, if its country is China and its capital value is in the set {Shanghai, Hong Kong}, its capital value should be updated to Beijing.

Consider the database D in FIG. 1. Tuple r1 does not match rule φ1, since r1[country]=China, but r1[capital]∈{Shanghai, Hong Kong}. On the contrary, tuple r2 matches rule φ1, since 2[country]=China, and r2[capital]∈{Shanghai, Hong Kong}. Similarly, we have r3 matches φ1 and r4 matches φ2.

Fixing Rules—Semantics

A fixing rule φ applies to a tuple t, denoted by t→φt', if (1) t matches φ, and (2) t' is obtained by the update t[B]:=+tp[B].

That is, if t[X] agrees with tp[X] and t[B] appears in the set −Tp[B], then +tp[B] is assigned to t[B]. Intuitively, if t[X] matches tp[X] and t[B] matches some value in −Tp[B], it is dependable to judge that t[B] is erroneous and hence, it is reliable to update t[B] to +tp[B]. This yields an updated tuple t' with t'[B]=+tp[B] and t'[R\{B}]=t[R\{B}].

Fixing rules are quite different from integrity constraints, such as CFDs. Integrity constraints have static semantics: they only detect data violations for given constraints, but they do not tell how to change resolve them. In contrast, a fixing rule φ specifies an action: applying φ to a tuple t yields an updated t'.

Editing rules have a dynamic semantics. In contrast to them, fixing rules (a) neither require the presence of master data or confidence values placed on attributes, and (b) nor interact with the users.

Fixing rules are different from Extract Transform Load (ETL) rules which refer to a process in database usage and especially in data warehousing that involves: (a) Extracting data from outside sources, (b) Transforming it to fit operational needs (which can include quality levels), and (c) Loading it into the end target e.g., database. Fixing rules, on the other hand, focus on detect errors from attribute values that depend on each other. Fixing rules can capture errors that ETL rules fail to detect.

In one embodiment, ETL rules are used to extract data from a source and fixing rules are then used to clean the extracted data.

Heuristic solutions, which use integrity constraints, may be used in addition to fixing rules. That is, fixing rules can be used initially to find dependable fixes and then heuristic solutions can be used to compute a consistent database.

Editing rules and fixing rules should be used for different targets. Editing rules are used for critical data, which needs heavy involvement of experts to ensure, for each tuple, that the attributes are correct. Fixing rules, on the other hand, can be used for more general data cleaning applications that cannot afford to involve users to clean each tuple.

Fixing Rule Algorithm

Recall that when applying a fixing rule φ to a tuple t, t[B] is updated with the value +tp[B]. To ensure that the change makes sense, the values that have been validated to be correct should remain unchanged in the following process. That is, after applying φ to t, the set $X \cup \{B\}$ of attributes should be marked as correct for tuple t.

The following algorithm is based on the above observation.

Algorithm. ApplyFixingRules input: a set Σ of fixing rules, and a tuple t output: a repaired tuple t'

(let V denote the set of attributes that are validated to be correct, initially empty)

step1: find a rule φ in (that can be applied to t;

step2: if such rule φ exists, update t to t' using φ, extend V to include validated attributes w.r.t. φ, and go back to step (1);

step3: if no such rule φ exists, return t'.

Note that the above algorithm will terminate, since the number of validated attributes in V will increase monotonically, up to the total number of attributes in relation R.

Data Fixing Rule Extensions (1) Similarity Operators

Domain-specific similarity functions are used in one embodiment to replace all equality comparisons. This makes it easier to capture typographical errors (e.g., Ottawo) and different spelling variants (e.g., Hong Kong and Peking), as opposed to including them as negative patterns in fixing rules.

(2) Wildcard

The wildcard '*' may be allowed in the pattern. For instance, a fixing rule can be extended as:

φ': ((([country],[China]),(capital, *))→Beijing)

Intuitively, the rule φ' assumes that for a tuple t, t[country] is correct, if t[country] is China. No matter what value that t[capital] takes, φ' will update t[capital] to Beijing. This is equivalent to the ETL lookup operations.

(3) Negation

In one embodiment, negations are added to the match conditions. Intuitively, a tuple can match a rule only when certain conditions are not satisfied. For instance, certain fixing rules can be applied when the country is not China.

The clear advantage of fixing rules, compared with the prior art, is that they can automatically detect errors and derive dependable repairs without interacting with the users, and without the assumption that some values have been validated to be correct. In contrast, all conventional techniques either (1) use heuristic approaches to compute a consistent database by making minimum number of changes, or (2) to consult the users, or use master data, or assume some attributes are correct, in order to derive dependable fixes.

Data fixing rules can be employed easily in many products to detect errors and perform dependable data repairing. Data fixing rules can be used to carry out more dependable data repairs than tools that are currently widely employed in industry (i.e., ETL tools) for name standardization, address check, etc.

Data has become an important asset in today's economy. Extracting values from large amounts of data to provide services and to guide decision making processes has become a central task in all data management stacks. The quality of data becomes one of the differentiating factors among businesses and the first line of defence in producing value from raw input data. As data is born digitally and is fed directly into stacks of information extraction, data integration, and transformation tasks, ensuring the quality of the data with respect to business and integrity constraints have become more important than ever.

2.2 Repairing Semantics with Fixing Rules

We next describe in more detail the semantics of applying a set of fixing rules.

Notations. For convenience, we use the following notations. Given fixing rule φ: $((X, t_p[X]), (B, T_p^-[B])) \rightarrow t_p^+, [B]$, we denote by $X_\varphi$ the set X of attributes in φ. Similarly, we write $t_p[X_\varphi], B_\varphi, T_p^-[B_\varphi]$ and $t_p^+[B_\varphi]$, relative to φ.

Note that when applying a fixing rule φ to a tuple t, we update $t_p[B_\varphi]$ with $t_p^+[B_\varphi]$. To ensure that the change makes sense, the values that have been used and corrected should remain unchanged in the following process. That is, after applying φ to t, the set $X_\varphi \cup \{B_\varphi\}$ of attributes should be marked as correct for tuple t.

In order to keep track of the set of attributes that has been marked correct, we introduce the notion assured attributes to represent them, denoted by $\mathcal{A}_t$ relative to tuple t. We simply write $\mathcal{A}$ when t is clear from the context. Consider a fixing rule φ. We say that φ is properly applied to a tuple t w.r.t. the assured attributes $\mathcal{A}$, denoted by $t \rightarrow (\mathcal{A},\varphi) t'$, if (i) t matches φ, and (ii) $B_\varphi \notin \mathcal{A}$.

That is, it is justified that to apply φ to t, for those t match φ, is correct. As $\mathcal{A}$ has been assured, we do not allow it to be changed by enforcing $B_\varphi \notin \mathcal{A}$ (the (ii) above).

EXAMPLE 1

Consider the fixing rule $\varphi_1$ in FIG. 3 and the tuple $r_2$ in FIG. 1. Initially, $\mathcal{A}_{r_2} = \emptyset$. The rule $\varphi_1$ can be properly applied to $r_2$ w.r.t. $\mathcal{A}_{r_2}$, since $r_2$[country]=China and $r_2$[capital]=Shanghai∈{Shanghai, Hong Kong} (i.e., $r_2$ matches $\varphi_1$); and moreover, capital∉$\mathcal{A}_{r_2}$. This yields an updated tuple $r'_2$ where $r'_2$[capital]=Beijing.

Observe that if $\rightarrow(\mathcal{A},\varphi)t'$, then $X_\varphi$ and $B_\varphi$ will also be marked correct. Thus, the assured attributes $\mathcal{A}$ should be extended as well, to become $\mathcal{A} \cup X_\varphi \cup \{B_\varphi\}$.

EXAMPLE 2

Consider Example 1. After $\varphi_1$ is applied to $r_2$, the assured attribute $\mathcal{A}_{r_2}$ will be expanded correspondingly, by including $X_{\varphi_1}$ (i.e., {country}) and $B_{\varphi_1}$ (i.e., {capital}), which results in an expanded assured attribute set $\mathcal{A}_{r_2}$={country, capital}.

We write $t \overset{=}{\rightarrow} (\mathcal{A},\varphi) t$ if φ cannot be properly applied to t, i.e., t is unchanged by φ relative to $\mathcal{A}$, if either t does not match φ, or $B_\varphi \notin \mathcal{A}$.

Consider a set Σ of fixing rules defined on R. Given a tuple t of R, we want a unique fix of t by using Σ. That is, no matter in which order the fixing rules of Σ are properly applied, Σ yields a unique by t' updating t.

To formalize the notion of unique fixes, we first recall the repairing semantics of fixing rules. Notably, if φ is properly applied to t via $t \rightarrow (\mathcal{A},\varphi)t'$ w.r.t. assured attributes $\mathcal{A}$, it yields an updated t' where $t[B_\varphi] \in T_p^-[B_\varphi]$ and $t'[B_\varphi]=t_p^+[B_\varphi]$. More specifically, the fixing rule φ first identifies $t[B_\varphi]$ as incorrect, and as a logical consequence of the application of φ, $t[B_\varphi]$ will be updated to $t_p^+[B_\varphi]$, as a validated correct value in t'. Once an attribute value t'[B] is validated, we do not allow it to be changed, together with the attributes $X_\varphi$ that are used as the evidence to assert that $t[B_\varphi]$ is incorrect.

Fixes.

We say that a tuple t' is a fix of t w.r.t. a set Σ of fixing rules, denoted by $t \overset{*}{\rightarrow}(\mathcal{A},\Sigma)t'$, if there exists a finite sequence $t=t_0, t_1, \ldots, t_k=t'$ of tuples of R such that for each $i \in [1, k]$, there exists a $\varphi_i \in \Sigma$ such that 1. $t_{i-1} \rightarrow (\mathcal{A}_i,\varphi_i) t_i$, where $\mathcal{A}_1=\emptyset$, $\mathcal{A}_i = \mathcal{A}_{i-1} \cup X_{\varphi_1} \cup \{B_{\varphi_1}\}$;

2. for any $\varphi \in \Sigma$, $t' \overset{=}{\rightarrow} (\mathcal{A}_k,\varphi) t'$.

Condition (1) ensures that each step of the process is justified, i.e., a fixing rule is properly applied. Condition (2) ensures that t' is a fixpoint and cannot be further updated.

Unique Fixes.

We say that an R tuple t has a unique fix by a set Σ of fixing rules if there exists a unique t' such that $t^* \rightarrow (\emptyset,\Sigma) t'$.

EXAMPLE 3

Consider Example 1. Indeed, $r'_2$ is a fix of r w.r.t. properly applied to $r_2$ rules $\varphi_1$ and $\varphi_2$ in Example 3, since no rule can be properly applied to $r'_2$, given the assured attributes to be {country, capital}.

Moreover, r2 is also a unique fix, since one cannot get a tuple different from when trying to apply rules $\varphi_1$ and $\varphi_2$ on tuple $r_2$ in other orders.

3. OVERCOMING FIXING RULE PROBLEMS

We next identify possible problems associated with fixing rules, and establish their complexity.

Termination.

One natural question associated with rule based data repairing processes is the termination problem. It is to determine that whether a rule-based process will stop. In fact, it is readily to verify that for the fix process (see Section 2.2) by applying fixing rules, it always terminates.

Consider the following. For a sequence of updates $t_0 \rightarrow (\mathcal{A}_1, \varphi_1) t_1 \cdots (\mathcal{A}_i, \varphi_i) t_i \ldots$, each time when a fixing rule $\varphi_i (i \geq 1)$ is applied as $t_{i-1} \rightarrow (\mathcal{A}_1, \varphi_1) t_i$, the number of validated attributes in $\mathcal{A}$ is strictly increasing, up to $|R|$, the cardinality of schema R.

Consistency.

The problem is to decide whether a set $\Sigma$ of fixing rules do not have conflicts. We say that $\Sigma$ is consistent if for any input tuple t of R, t has a unique fix by $\Sigma$.

EXAMPLE 4

Consider a fixing rule $\varphi'_1$ by adding a negative pattern to the $\varphi_1$ in the fixing rules in FIG. 3 as the following:

$\varphi'_1$: (([country], [China]), (capital, {Shanghai, Hongkong, Tokyo}))→Beijing The revised rule $\varphi'_1$ states that, for a tuple, if its country is China and its capital value is Shanghai, Hongkong or Tokyo, its capital is wrong and should be updated to Beijing.

Consider another fixing rule $\varphi_3$ as: for t in relation Travel, if the conf is ICDE, held at city Tokyo and capital Tokyo, but the country is China, its country should be updated to Japan. This fixing rule can be formally expressed below: $\varphi_3$ (([capital, city, conf], [Tokyo, Tokyo, ICDE]), (country, {China}))→Japan We show that these two fixing rules, $\varphi'_1$ and $\varphi_3$, are inconsistent. Consider the tuple $r_3$ in FIG. 1. Both $\varphi'_1$ and $\varphi_3$ can be applied to $r_3$. It has the following two fixes:

(1) $r_3$: it will change attribute $r_3$ [capital] from Tokyo to Beijng. This will result in an updated tuple as: $r'_3$: (Peter, China, Beijing Tokyo, ICDE).

It also marks attributes {country, capital} as assured, such that $\varphi_3$ cannot be properly applied, i.e., $r'_3$ is a fixpoint.

(2) $r_3 \rightarrow_{(\emptyset, \varphi_3)} r''_3$: it will update $r_3$ [country] from China to Japan. This will yield another updated tuple as: (Peter, Japan, Tokyo, ICDE).

The attributes {country, capital, conf} will be marked as also a fixpoint. Observe that the above two fixes (i.e., $r'_3$ and $r''_3$) will lead to different fixpoints, where the difference is highlight above. Therefore, $\varphi'_1$ and $\varphi_3$ are inconsistent. Indeed, $r'_3$ contains errors while $r''_3$ is correct.

The consistency problem is to determine, given a set $\Sigma$ of fixing rules defined on R, whether $\Sigma$ is consistent. Intuitively, this is to determine whether the rules in $\Sigma$ are dirty themselves. The practical need for the consistency analysis is evident: we cannot apply these rules to clean data before $\Sigma$ is ensured consistent itself.

This problem has been studied for CFDs, MDs, and editing rules. It is known that the consistency problem for MDs is trivial: any set of MDs is consistent. They are NP-complete (resp. coNP-complete) for CFDs (resp. editing rules). We shall show that the problem for fixing rules is PTIME, lower than their editing rules counterparts.

Theorem 1:

The consistency problem of fixing rules is PTIME.

We prove Theorem 1 by providing a PTIME algorithm for determining whether a given set of fixing rules is consistent (see Section 4.2).

The low complexity from the consistency analysis tells us that it is feasible to efficiently find consistent fixing rules.

Implication.

Given a set $\Sigma$ of consistent fixing rules, and another fixing rule $\varphi$ that is not in $\Sigma$, we say that $\varphi$ is implied by $\Sigma$, denoted by $\Sigma \models \varphi$, if:

(i) $\Sigma \cup \{\varphi\}$ is consistent; and (ii) for any input t where $t^*_{\rightarrow \Sigma} t'$. and $t^*_{\rightarrow \Sigma \cup \{\varphi\}} t''$, t',and t'' are the same.

Condition (i) says that $\Sigma$ and $\varphi$ must agree on each other.

Condition (ii) ensures that for any tuple t, applying $\Sigma$ or $\Sigma \cup \{\varphi\}$ will result in the same updated tuple, which means that $\varphi$ is redundant.

The implication problem is to decide, given a set $\Sigma$ of consistent fixing rules, and another fixing rule $\varphi$, whether $\Sigma$ implies $\varphi$.

Intuitively, the implication analysis helps us find and remove redundant rules from $\Sigma$, i.e., those that are a logical consequence of other rules in $\Sigma$, to improve performance.

No matter how desirable to remove redundant rules, unfortunately, the implication problem is coNP-complete.

Theorem 2:

The implication problem of fixing rules is coNP-complete. It is down to PTIME when the relation schema R is fixed.

Proof Sketch: (A) General Case. Lower Bound.

We show the implication problem is coNP-hard by reduction from the 3SAT problem, which is NP-complete [23], to the complement of the implication problem.

Upper Bound.

To show it is in coNP, we first establish a small model property: a set $\Sigma$ of fixing rules is consistent if and only if for any tuple t of R consisting of values appeared in $\Sigma$, t has a unique fix by $\Sigma$. We then give an NP algorithm to its complement problem that first guesses a tuple t with values appear in $\Sigma$ and then checks whether t has a unique fix by $\Sigma$ in PTIME.

(B) Special Case: When R is Fixed.

We show that for fixed R, only polynomially number of tuples need to be guessed and checked with a PTIME algorithm. Thus it is down to PTIME in this special case.

Determinism.

The determinism problem asks whether all terminating cleaning processes end up with the same repair. From the definition of consistency of fixing rules, it is trivial to get that, if a set $\Sigma$ of fixing rules is consistent, for any t of R, applying $\Sigma$ to t will terminate, and the updated t' is deterministic (i.e., a unique result).

4. ENSURING CONSISTENCY

The following description covers methods for identifying consistent rules. We first describe the workflow for obtaining a set of consistent fixing rules (Section 4.1). We then present algorithms to check whether a given set of rules is consistent (Section 4.2). We also discuss how to resolve inconsistent fixing rules, and ensure the workflow terminates (Section 4.3).

Overview

Given a set $\Sigma$ of fixing rules, our workflow contains the following three steps to obtain a set $\Sigma'$ of fixing rules that is ensured to be consistent. The workflow is illustrated in FIG. 4 of the accompanying drawings.

Step 1:

It checks whether the given $\Sigma$ of fixing rules is consistent. If it is inconsistent, it goes to step (2). Otherwise, it goes to step (3).

Step 2:

We allow either an automatic algorithm or experts to examine and resolve inconsistent fixing rules. After some rules are revised, it will go back to step (1).

Step 3:

It terminates when the set $\Sigma'$ of (possibly) modified fixing rules is consistent.

It is desirable that the users are involved in step (2) when resolving inconsistent rules, in order to obtain high quality fixing rules.

4.2 Checking Consistency

We first present a proposition, which is the pivot of designing efficient algorithms for checking consistency.

Proposition 3:

For a set $\Sigma$ of fixing rules, $\Sigma$ is consistent, iff (if and only if) any two fixing rules $\varphi_i$ and $\varphi_j$ in $\pi$ are consistent.

Proof Sketch:

Let n be the number of rules in $\Sigma$. When n=1, $\Sigma$ is trivially consistent. When n=2, $\Sigma$ is consistent is the same as $\varphi_i$ and $\varphi_j$ are consistent
i≠j. When n≥3, we prove by contradiction.

Suppose that although the fixing rules are pairwise consistent, when putting together, they are inconsistent. In other words, they may lead to (at least) two different fixes, i.e., the fixes are not unique. More concretely, there exist (at least) two non-empty sequences of fixes as follows:

$s_1: t = t_1 \to_{(\emptyset, \varphi_1)} t_1 \quad \cdots \quad \to (\mathcal{A}_{i-1}, \varphi_i) t_i \quad \cdots$
$\to (\mathcal{A}_{m-1}, \varphi_m) t_m = t'$ $s_2: t = t'_0 \to_{(\emptyset, \varphi'_1)} t'_1 \quad \cdots \quad \to (\mathcal{A}'_{j-1}, \varphi'_j) t'_j \quad \cdots$
$\to (\mathcal{A}'_{n-1}, \varphi'_n) t'_n = t''$ (i) $\mathcal{A}_m \cap \mathcal{A}'_n = \emptyset$
(ii) $\mathcal{A}_m \cap \mathcal{A}'_n \neq \emptyset$ and $t'[\mathcal{A}_m \cap \mathcal{A}'_n] = t''[\mathcal{A}_m \cap \mathcal{A}'_n]$; and
(iii) $\mathcal{A}_m \cap \mathcal{A}'_n \neq \emptyset$ and $t'[\mathcal{A}_m \cap \mathcal{A}'_n] \neq t''[\mathcal{A}_m \cap \mathcal{A}'_n]$, where
$\mathcal{A}_m = \mathcal{A}_{m-1} \cup X_{\varphi_m} \cup \{B_{\varphi_m}\}$
and $\mathcal{A}'_n = \mathcal{A}'_{n-1} \cup X_{\varphi'_n} \cup \{B_{\varphi'_n}\}$.

For cases (i)(ii), we prove that either $S_1$ or $S_2$ does not reach a fixpoint, i.e., it is not a fix. For case (iii), we show that there must exist a $\varphi'_i$ (in sequence $S_1$) and a $\varphi'_j$ sequence $S_2$) that are inconsistent.

Putting all contradicting cases (i,ii,iii) together, it suffices to see that we were wrong to assume that $\Sigma$ is inconsistent.

Assume there exist inconsistent $\varphi_i$ and $\varphi_j$. We show that for any tuple t that leads to different fixes by $\varphi_i$ and $\varphi_j$, we can construct two fixes $S'_1$ and $S'_2$ on t by using the rules in $\Sigma$. In $S'_1$, $\varphi_i$ is applied first; while in $S'_2$, $\varphi_j$ is applied first. We prove that these two fixes must yield two different fixpoints. This suffices to show that we were wrong to assume that there exist inconsistent $\varphi_i$ and $\varphi_j$.

The Appendix section below shows a detailed proof.

Proposition 3 tells us that to determine whether $\Sigma$ is consistent, it suffices to only check them pairwise. This significantly simplifies the problem and complexity of checking consistency. Next, we describe two algorithms to check the consistency of two fixing rules, by using the result from Proposition 3. One algorithm is based on tuple enumeration, while the other is via rule characterization.

4.2.1 Tuple Enumeration

Consider that although there may exist infinitely many t, whether there exists a finite set of tuples such that it suffices to inspect those t only for two rules $\varphi_i$ and $\varphi_j$. In other words, for the other tuples, neither $\varphi_i$ and $\varphi_j$ can be applied.

To begin an algorithm for tuple enumeration, we describe what tuples are necessary to be enumerated, and in which case that tuple enumeration can be avoided.

Lemma 4:

Fixing rules $\varphi_i$ and $\varphi_j$ are consistent, if there does not exist any tuple t that matches both $\varphi_i$ and $\varphi_j$.

Proof. If $\nexists$ t such that $t \vdash \varphi_i$ and $\vdash \varphi_j$, for any t, there are two cases: either no rule can be applied, or there exists a unique sequence of applying both rules. Either case will not cause different fixes, i.e., $\varphi_i$ and $\varphi_j$ are consistent.

Note that Lemma 4 is for "if" but not "iff", which tells us that only tuples that draw values from evidence pattern and negative patterns can (possibly) match both rules at the same time. Next we illustrate the tuples that are needed to be generated by an example.

EXAMPLE 1

Consider rules $\varphi_i$ and $\varphi_j$ in shown in FIG. 3. We have two constants in the evidence pattern as {China, Canada}, and three constants in the negative patterns as {Shanghai, Hongkong, Toronto}. Hence, we only need to enumerate 2×3=6 tuples for relation Travel as follows: (◦, China, Shanghai, ◦,◦), (◦, China, Hongkong, ◦, ◦) (◦, China, Toronto, ◦, ◦), (◦, Canada, Shanghai, ◦, ◦) (◦, Canada, Hongkong, ◦, ◦) (◦, Canada, Toronto, ◦, ◦) where '◦' is a special character that is not in any active domain, i.e., it does not match any constant. One can verify that no other tuples can both match $\varphi_i$ and $\varphi_j$.

Let $\{A_1 \ldots A_m\}$ be all attributes appearing in $\varphi_i$ and appear either in evidence pattern or negative patterns of $\varphi_j$. Let $V_{\varphi ij}(A)$ denote the set of constant values of A that $\varphi_i$ and $\varphi_j$. The total number of tuples to be enumerated is $\Pi_{l \in [1,m]} (|V_{\varphi ij}(A_l)|)$, where $\Pi$ indicates a product and $|V_{\varphi ij}(A_l)|$ denotes the cardinality of $V_{\varphi ij}(A_l)$.

Given a set $\Sigma$ of fixing rules, we check them pairwise (see Example 4). If any pair of rules is inconsistent, we judge that $\Sigma$ is inconsistent; otherwise, $\Sigma$ is consistent. The algorithm is shown in FIG. 5 and referred to as isConsist$^t$.

4.2.2 Rule Characterization

The following description covers analysis by characterizing the fixing rules.

Also based on Lemma 4, let us focus on the cases of $\varphi_i$ and $\varphi_j$ that there exists some t that can match both fixing rules, where these rules are represented as follows:

$\varphi_i: ((X_i, t_{p_i}[X_i]), (B_i, T_{p_i}^-[B_i])) \to t_{p_i}^+[B_i]$
$\varphi_j: ((X_j, t_{p_j}[X_j]), (B_j, T_{p_j}^-[B_j])) \to t_{p_j}^+[B_j]$ Note that a tuple t matching $\varphi_i$ and $\varphi_j$ implies that the following conditions hold: $t[X_i] = t_{p_i}[X_i]$ and $t[X_j] = t_{p_j}[X_j]$. Hence, we have $t_{p_i}[X_i \cap X_j] = t_{p_j}[X_i \cap X_j]$, where a special case is $X_i \cap X_j = \emptyset$. We consider two cases: $B_i = B_j$ and $B_i \neq B_j$.

Case 1:

$B_i = B_j$. Let $B = B_i = B_j$. There is a conflict only when (i) there exists a tuple t that matches both $\varphi_i$ and $\varphi_j$, and (ii) $\varphi_i$ and $\varphi_j$ will update t to different values. From (i) we have $t[B] \in T_{p_i}^-[B]$ and $t[B] \in T_{p_j}^-[B]$, which gives $T_{p_i}^-[B] \cap T_{p_j}^-[B] \neq \emptyset$ i.e., they can be applied at the same time. From (ii) we have $t_{p_i}^+[B] \neq t_{p_j}^+[B]$, i.e., they lead different fixes. From (i) and (ii), the extra condition that $\varphi_i$ and $\varphi_j$ are inconsistent under such case $T_{p_i}^-[B] \cap T_{p_j}^-[B] \neq \emptyset$ and $t_{p_i}^+[B] \neq t_{p_j}^+[B]$.

Case 2:

$B_i \neq B_j$. Again, we consider four cases:
(a) $B_i \in X_j$ and $B_j \notin X_i$, (b) $B_i \notin X_j$ and $B_j \in X_i$, (c) $B_i \in X_j$ and $B_j \in X_i$, and (d) $B_i \notin X_j$ and $B_j \notin X_i$.

(a) $B_i \in X_j$ and $B_j \notin X_i$. If a tuple t matches $\varphi_i$ and $\varphi_j$, then (i) $t[B_i] \in T_{p_i}^-[B_i]$ (to match $\varphi_i$), and (ii) $[B_j] \in T_{p_j}^-[B_j]$ (to match $\varphi_j$). Observe the following: if $\varphi_j$ is applied to t first, since $B_i \in X_j$, it will keep $t[B_i]$ unchanged, whereas if $\varphi_i$ is applied first, it will update $t[B_i]$ to a different value (i.e., $t_{p_i}^+[B_i]$). This will cause different fixes. Hence, $\varphi_i$ and $\varphi_j$ are inconsistent only when $t_{p_j}^+[B_i] \in T_{p_i}^-[B_i]$ (by merging (i) and (ii)).

(b) $B_i \notin X_j$ and $B_j \in X_i$. This is symmetric to case (a). Therefore, $\varphi_i$ and $\varphi_j$ are inconsistent only when $t_{p_i}[B_j] \in T_{p_j}^-[B_j]$.

(c) $B_i \notin X_j$ and $B_j \notin X_i$. This is the combination of cases (a) and (b). Thus, $\varphi_i$ and $\varphi_j$ are inconsistent when $t_{p_i}[B_j] \in T_{p_j}^-[B_j]$ and $t_{p_j}[B_i] \in T_{p_i}^-[B_i]$.

(d) $B_i \notin X_j$ and $B_j \notin X_i$. For any tuple t that matches both $\varphi_i$ and $\varphi_j$, rule $\varphi_i$ (resp. $\varphi_j$) will deterministically update $t[B_i]$ (resp. $t[B_j]$) to $t_{p_i}^+[B_i]$ (resp. $t_{p_j}^+[B_j]$). That is, $\varphi_i$ and $\varphi_j$ are always consistent in this case.

EXAMPLE 2

Consider $\varphi'_1$ and $\varphi_3$ in Example 8 and $\varphi_2$ in the fixing rules shown in FIG. 3.

Since $\varphi'_1$ (resp. $\varphi_2$) is only applied to a tuple whose country is China (resp. Canada), there does not exist any tuple that can match both rules at the same time. Therefore, based on Lemma 4, we have $\varphi'_1$ and $\varphi_2$ are consistent.

Also, it can be verified that $\varphi'_1$ and $\varphi_3$ are inconsistent Consider the following:
(i) $B_{\varphi_3} \in X_{\varphi'_1}$ (i.e., country∈{country, capital}),
(ii) $t_{p_1}[B_{\varphi_3}] \in T_{p_3}^-[B_{\varphi_3}]$ (i.e., China∈{China}),
(iii) $B_{\varphi'_1} \in X_{\varphi_3}$ (i.e., capital∈{capital, city, conf}), and
(iv) $t_{p_3}[B_{\varphi'_1}] \in T_{p_1}^-[B_{\varphi'_1}]$ (i.e., Tokyo∈{Shanghai, Hongkong, Tokyo}).

Hence, these two rules will lead to different fixes, which is captured by case 2(c).

Algorithm.

The algorithm to check whether a set of fixing rules is consistent via rule characterization, referred to as isConsist$^r$, is given in FIG. 5 of the accompanying drawings. It takes Σ as input, and returns a boolean value, where true indicates that Σ is consistent and false otherwise.

It enumerates all pairs of distinct rules (lines 1-11). If any pair is inconsistent, it returns false (lines 5,7,9,11); otherwise, it reports that Σ is consistent (line 12). It covers all cases that two rules can be inconsistent, i.e., case 1 (lines 2-5), case 2(a) (lines 6-7), case 2(b) (lines 8-9) and case 2(c) (lines 10-11). Note that in case 2(d), two rules are trivially consistent. Hence, there is no need to capture such case.

Correctness & Complexity.

Its correctness is ensured by Proposition 3 and Lemma 4. From the analysis above, Algorithm isConsist$^r$ covers all cases that two rules can be inconsistent. That is, the two rules $\varphi_i$ and $\varphi_j$ are consistent for all other cases. We use a hash table to check that whether a constant matches some negative pattern in constant time. To summarize, it enumerates all pairs of rules, and runs in $O(size(\Sigma)^2)$ time, where size(Σ) is the size of Σ.

4.3 Resolving Inconsistent Rules

When inconsistency of fixing rules is detected, this inconsistency has to be resolved, before these rules can be used.

Consider Example 2 that two rules $\varphi'_1$ and $\varphi_3$ are inconsistent, which is depicted in FIG. 6 of the accompanying drawings, where the conflicts come from the two highlighted Tokyo's and China's. A conservative algorithm removes all rules that are in conflict. This process ensures termination since the number of rules is strictly decreasing, until the set of rules is consistent or becomes empty. Although the remaining rules are consistent, the problem is that this will also remove some useful rules (e.g., $\varphi_3$). It is difficult for automatic algorithms to solve such semantic problems well.

Hence, in order to obtain high quality rules, the system requests an expert to examine rules that are in conflict manually. For example, the expert can naturally remove Tokyo from the negative patterns of $\varphi'_1$, since one cannot judge, given (China, Tokyo), which attribute is wrong. This will result in a modified rule $\varphi_1$ (see the fixing rules in FIG. 3), which is consistent with $\varphi_3$. Note that in order to ensure this process terminates, we only allow to remove some negative patterns (e.g., from $\varphi'_1$ and $\varphi_1$), or remove some fixing rules, without adding values.

5. REPAIRING WITH FIXING RULES

We now describe how to use the fixing rules to repair data.

In the following, we first present a chase-based algorithm to repair one tuple (Section 5.1), with time complexity in $O(size(\Sigma)|R|)$. We also present a fast algorithm (Section 5.2) running in $O(size(\Sigma))$ time for repairing one tuple.

5.1 Chase-Based Algorithm

Note that, given a tuple t and a set Σ of fixing rules, if Σ is consistent, it has the Church-Rosser property, i.e., all the chase sequences using Σ lead to a unique fix, no matter in what orders these rules are applied.

We next present the algorithm, by using a chase process.

Algorithm.

The algorithm, referred to as cRepair, is shown in FIG. 7 of the accompanying drawings. It takes as input a tuple t and a set Σ of consistent fixing rules. It returns a repaired tuple t' w.r.t. Σ.

The algorithm first initializes a set of assured attributes, a set of fixing rules that can be possibly applied, a tuple to be repaired, and a flag to indicate whether the tuple has been changed (line 1). It then iteratively examines and applies the rules to the tuple (lines 2-7). If there is a rule that can be properly applied (line 5), it updates the tuple (line 6), maintains the assured attributes and rules that can be used correspondingly, and flags this change (line 7). It terminates when no rule can be further properly applied (line 2), and the repaired tuple will be returned (line 8).

Correctness & Complexity.

The correctness of cRepair is inherently ensured by the Church-Rosser property, since Σ is consistent. For the complexity, observe the following. The outer loop (lines 2-7) iterates at most |R| times. For each loop, it needs to scan each unused rule, and checks whether it can be properly applied to the tuple. From these it follows that Algorithm 6 runs in $O(size(\Sigma)|R|)$ time.

5.2 A Fast Repairing Algorithm

We now describe how to improve the chase-based procedure. One way is to consider how to avoid repeatedly checking whether a rule is applicable, after each update of the tuple being examined.

Note that a property of employing fixing rules is that, for each tuple, each rule can be applied only once. After a rule is applied, in consequence, it will mark the attributes associated with this rule as assured, and does not allow these attributes to be changed any more (see Section 2.2).

Hence, after each value update, to (i) efficiently identify the rules that cannot be applied, and (ii) determine unused rules that can be possibly applied.

We employ two types of indices in order to perform the above two targets. Inverted lists are used to achieve (i), and hash counters are employed for (ii). Before describing how to use these indices to design a fast algorithm, we shall define these indices to assist in understanding the algorithm.

Inverted Lists.

Each inverted list is a mapping from a key to a set Y of fixing rules. Each key is a pair (A, a) where A is an attribute and a is a constant value. Each fixing rule $\varphi$ in the set Y satisfies $A \in X_\varphi$ and $t_p[A]=a$.

For example, an inverted list w.r.t. $\varphi_1$ in FIG. 3 is as:
country, China→$\varphi_1$ Intuitively, when the country of some tuple is China, this inverted list will help to identify that $\varphi_1$ might be applicable.

Hash Counters.

It uses a hash map to maintain a counter for each rule. More concretely, for each rule and and $\varphi$, the counter $c(\varphi)$ is a nonnegative integer, denoting the number of attributes that a tuple agrees with $t_p[X_\varphi]$.

For example, consider $\varphi_1$ in Example 3 and $r_2$ in FIG. 1. We have $c(\varphi_1)=1$ w.r.t. tuple $r_2$, since both $r_2$ [country] and $t_{p1}$ [country] are China. As another example, consider $r_4$ in FIG. 1, we have $c(\varphi_1)=0$ w.r.t. tuple $r_4$, since $r_4$ [country]=Canada but $t_{p1}$ [country]=China.

We now describe a fast algorithm by using the two indices introduced above. Note that inverted lists are built only once for a given $\Sigma$, and keep unchanged for all tuples. The hash counters will be initialized to zero for the process of repairing each new tuple.

Algorithm.

The algorithm IRepair is shown in FIG. 8 of the accompanying drawings. It takes as input a tuple t, a set $\Sigma$ of consistent fixing rules, and inverted lists 1. It returns a repaired tuple t' w.r.t. $\Sigma$. It first initializes a set of assured attributes, a set of fixing rules to be used, and a tuple to be repaired (line 1). It also clears the counters for all rules (line 2). It then uses inverted lists to initialize the counters (lines 3-5). After the counters are initialized, it checks and maintains that which rules might be used (lines 6-7), and uses a chase process to repair the tuple (lines 8-16), and returns the repaired tuple (line 17).

During the process (lines 8-16), it first randomly picks a rule that might be used (line 9). The rule will be applied if it is verified to be applicable (lines 10-11). The set of attributes that is assured correct is increased correspondingly (line 12). The counters will be recalculated (lines 13-14). Moreover, if new rules might be used due to this update, it will be identified (line 15). The rule that has been checked will be removed (line 16), no matter it is applicable or not. Observe the following two cases. (i) If a rule is removed after being applied at line 16 (i.e., line 10 gives a true), it cannot be used again and will not be checked at lines 13-15. (ii)) If a rule $\varphi$ is removed without being applied at line 16 (i.e., line 10 gives a false), it cannot be used either at lines 13-15. The reason is that: for any rule $\varphi$, if $\varphi$ cannot be properly applied to t', any update on attribute $B_\varphi$ will mark it as assured, such that q, cannot be properly applied afterwards. From the above (i) and (ii), it follows that it is safe to remove a rule from $\Gamma$, after it has been checked, once and for all.

Correctness.

Note that $\Sigma$ is consistent, we only need to prove the repaired tuple t' is a fix of t. This can be proved based on (1) at any point, $\Gamma$ includes all fixing rules that might match the given tuple; and (2) each fixing rule is added into $\Gamma$ at most once. Hence, the algorithm terminates until it reaches a fixpoint when $\Gamma$ is empty.

Complexity.

It is clear that the three loops (line 2, lines 3-5 and lines 6-7) all run in time linear to size($\Sigma$). Next let us consider the while loop (lines 8-16). Observe that each rule $\varphi$ will be checked in the inner loop (lines 13-15) up to $|X_\varphi|$ times, by using the inverted lists and hash counters, independent of the number of outer loop iterated. The other lines of this while loop can be done in constant time. Putting together, the total time complexity of the algorithm is O(size($\Sigma$)).

We next show by example how Algorithm IRepair works.

EXAMPLE 5

Consider Travel data D in FIG. 1, rules $\varphi_1$, $\varphi_2$ in FIG. 3 and rule $\varphi_3$. In order to better understand the chase process, we introduce another rule:

$\varphi_4$: (([capital, conf], [Beijing, ICDE]), (city, {Hongkong})→Shanghai

Rule $\varphi_4$ states that: for t in relation to Travel, if the conf is ICDE, held at some country whose capital is Beijing, but the city is Hongkong, its city should be Shanghai. This holds since ICDE was held in China only once at 2009, in Shanghai but never in Hongkong.

Given the four fixing rules $\varphi_1$-$\varphi_4$, the corresponding inverted lists are given in FIG. 9(a). For instance, the third key (conf, ICDE) links to rules $\varphi_3$ and $\varphi_4$, since conf$\in X_{\varphi_3}$ (i.e., {capital, city, conf}) and $t_{p3}$ [conf]=ICDE; and moreover, conf$\in X_{100_4}$ (i.e., {capital, conf}) and $t_{p4}$ [conf]=ICDE. The other inverted lists are built similarly.

Now we show how the algorithm works over tuples $r_1$ to $r_4$, which is also depicted in FIG. 9 of the accompanying drawings. Here, we highlight these tuples in two hatched boxes, where one hatched box indicates that the tuple is clean (i.e., $r_1$), while the other hatched box indicates that the tuples contain errors (i.e., $r_2$, $r_3$ and $r_4$).

$r_1$:

The algorithm initializes (lines 1-7) and finds that $\varphi_1$ may be applied, maintained in $\Gamma$. In the first iteration (lines 8-16), it finds that $\varphi_1$ cannot be applied, since $r_1$ [capital] is Beijing, which is not in the negative patterns {Shanghai, Hongkong} of $\varphi_1$. Also, no other rules can be applied. It terminates with tuple $r_1$ unchanged. Actually, $r_1$ is a clean tuple.

$r_2$:

The algorithm initializes and finds that $\varphi_1$ might be applied. In the first iteration (lines 8-16), rule $\varphi_1$ is applied to $r_2$ and updates $r_2$ [capital] to Beijing. Consequently, it uses inverted lists (line 13) to increase the counter of $\varphi_4$ (line 14) and finds that $\varphi_4$ might be used (line 15). In the second iteration, rule $\varphi_1$ is applied and updates $r_2$ [city] to Shanghai. It then terminates since no other rules can be applied.

$r_3$:

The algorithm initializes and finds that $\varphi_3$ might be applied. In the first iteration, rule $\varphi_3$ is applied and updates $r_3$ [country] to Japan. It then terminates, since no more applicable rules.

$r_4$:

The algorithm initializes and finds that $\varphi_4$ might be applied. In the first iteration, rule $\varphi_2$ is applied and updates $r_4$ [capital] to Ottawa. It will then terminate.

At this point, we see that all the four errors shown in FIG. 1 have been corrected.

6. EXPERIMENTAL STUDY

We conducted experiments with both real-life and synthetic data to examine our algorithms. Specifically, we evaluated (1) the efficiency of consistency checking for fixing rules; (2) the accuracy of our data repairing algorithms with fixing rules; and (3) the efficiency of data repairing algorithms using fixing rules.

It is worth noting that the purpose of these experiments is to test, when given high quality fixing rules, how they can be used to automatically repair data with high dependability.

6.1 Experimental Setting

Experimental Data.

We used real-life and synthetic data. (1) HOSP was taken from us Department of Health & Human Services (http://www.hospitalcompare.hhs.gov/). It has 115K records with the following attributes: Provider Number (PN), Hospital Name (HN), address1, address2, address3, city, state, zip, county, Phone Number (phn), HospitalType (ht), HospitalOwner (ho), EmergencyService (es) Measure Code (MC), Measure Name (MN), condition, and stateAvg.

(2) UIS data was generated by a modified version of the UIS Database generator (http://www.cs.utexas.edu/users/ml/riddle/data.html). It produces a mailing list that has the following schema: RecordID, ssn, FirstName (fname), MiddleInit (minit), LastName (lname), stnum, stadd, apt, city, state, zip.

Dirty Data Generation.

We treated clean datasets as the ground truth. Dirty data was generated by adding noise only to the attributes that are related to some integrity constraints, which is controlled by noise rate (10% by default). We introduced two type of noises: typos and errors from the active domain.

Fixing Rules Generation from Samples.

Note that fixing rules are instance based, i.e., all values for identifying and correcting errors are encoded inside fixing rules, one natural question is that how fixing rules were obtained.

Sample Generation.

Since each fixing rule is defined on semantically related attributes, we start with known data dependencies (e.g., functional dependencies for our testing). We first detect violations of given functional dependencies (FDs), and present them to the experts. The experts produced several fixing rules as samples, based on their understanding of these violations.

Rule Generation.

Given sample fixing rules, we enrich them by only enlarging their negative patterns, via extracting new negative patterns from other tables in the same domain. For instance, consider the fixing rules shown in FIG. 3. If users provide a fixing rule that takes China as the evidence pattern, and some Chinese cities (e.g., Shanghai, Hong Kong) other than Beijing as negative patterns, one can enlarge its negative patterns by extracting large cities from a table about Chinese cities.

We generated 100 fixing rules for HOSP data, and 1000 fixing rules for UIS data. Note that the purpose of fixing rules generation is not to use them for some specific dataset. It is, by collecting expert knowledge for specific errors, to learn high quality domain related rules that can be used to automatically detect and repair data for other datasets in the same domain.

Measuring Quality.

To assess the accuracy of data cleaning algorithms, we use precision and recall, where precision is the ratio of corrected attribute values to the number of all the attributes that are updated, and recall is the ratio of corrected attribute values to the number of all erroneous attribute values.

We mainly compare automated data cleaning techniques. Note that they are designed for a slightly different target: computing a consistent database. We consider it a relative fair comparison, since all fixing rules we generated are from FD violations. In other words, the fixing rules and the FDs used are defined on exactly the same set of attributes. We employed the FDs shown in FIG. 10 of the accompanying drawings for HOSP and UIS data, respectively.

(2) Editing Rules.

We also compared our approach with editing rules. Although editing rules can repair data that is guaranteed to be correct, they are measured by the number of user interactions per tuple. That is, for each tuple and for each editing rule to be applied, the users have to be asked. To this purpose, we evaluated the number of errors that can be corrected by every fixing rule (see FIG. 9($a$)) using HOSP data with 100 rules and 10% dirty rate, where the x-axis is for fixing rules and the y-axis is the number of errors they can correct. The experiment shows that a single fixing rule was able to repair errors in more than fifty tuples, but if we employ editing rules to repair these errors, the approach has to interact with users over fifty times.

Moreover, we encoded data values from master data into editing rules, to make it an automated rule. Note that error information is not in master data, e.g., the negative patterns in fixing rules, which cannot be encoded. Hence, we removed negative patterns in fixing rules, to simulate editing rules. Specifically, each time when seeing an evidence pattern, it simulated users by saying yes, and then updated the right hand side value to the fact. The experimental results are shown in FIG. 9($b$). The reason that fixing rules have better precision and recall is that, if we have errors in the right hand side of such rules, (automated) editing rules can correct them. However, if there are errors in the left hand side, they will introduce new errors by treating these errors as correct values, resulting in lower precision and in consequence, lower recall. Note that the purpose of designing editing rules is for critical data at entry point by interacting with the users. Hence, we don't compare with them in later of this section.

Algorithms.

We have implemented the following algorithms in C++: (1) isConsist$^t$: the algorithm for checking consistency based on tuple enumeration (Section 4.2); (2) isConsist$^r$: the algorithm for checking consistency based on rule characterization (FIG. 5 in Section 4.2); (3) cRepair: the basic chase-based algorithm for repairing with fixing rules (see FIG. 7); and (4) IRepair: the fast repairing algorithm (see FIG. 8). Moreover, for comparison, we obtained the implementation of two algorithms for FD repairing, a cost-based heuristic method, referred to as Heu, and an approach for cardinality set minimal, referred to as Csm. Both approaches were implemented in Java. All experiments were conducted on a Windows machine with a 3.0 GHz Intel CPU and 4 GB of memory.

6.2 Experimental Results

We next report our findings from the experimental study.

Exp-1: Efficiency of Checking Consistency.

We evaluated the efficiency of checking consistency by varying the number of rules employed. The results for HOSP and UIS are shown in FIG. 11($a$) and FIG. 11($b$), respectively. The x-axis is the number of rules multiplied by 100 (resp. 10) for HOSP (resp. UIS), and the y-axis is the running time in millisecond (msec).

For either isConsist$^t$ or isConsist$^r$, we plotted its worst case, i.e., checking all pairs of rules, as well as its 10 real cases where it terminated when some pair was detected to be inconsistent. For example, in FIG. 11($a$), the big circle for x=2 was for checking 200 rules in the worst case, while the 10 small circles below it were for real cases. In FIG. 11(b), real cases are the same as the worst case, since the 100 rules are consistent and all pairs of distinct rules have to be checked.

These figures show that to check consistency of fixing rules, the algorithm with tuple enumeration (isConsist$^t$) is slower, as expected. The reason is that enumerating tuples for two rules is more costly than characterizing two rules.

In addition, this set of experiment validated that the consistency of fixing rules can be checked efficiently. For example, it only needs 12 seconds to check the consistency of 1000*1000 pairs of rules, i.e., the top right point in FIG. 11(a).

The results of this study indicate that it is feasible to check consistency for a reasonably large set of fixing rules.

Exp-2: Accuracy.

In this set of experiments, we will study the followings. (a) The effect of different data errors (i.e., typos or errors from active domain) for repairing algorithms. (b) The influence of fixing rules w.r.t. their sizes. We use Fix to represent repairing algorithms with fixing rules.

(a) Noise from the Active Domain.

Recall that noise was obtained by either introducing typos to an attribute value or changing an attribute value to another one from the active domain of that specific attribute. For example, an error for Ottawa could be Ottawo (i.e., a typo) or Beijing (i.e., a value from active domain).

Precision.

We fixed the noise rate at 10%, and varied the percentage of typos from 0% to 100% by a step of 10% (x-axis in both charts from FIGS. 12(a) and 12(e) for HOSP and UIS, respectively). Both figures showed that our method using fixing rules performed dependable fixes (i.e., high precision), and was not sensitive to types of errors. While for the existing algorithms Heu and Csm, they had lower precision when more errors were from the active domain. The reason is that for such errors, heuristic methods would erroneously connect some tuples as related to violations, which might link previously irrelevant tuples and complicate the process when fixing the data. Indeed, however, both Heu and Csm computed a consistent database, as targeted.

Note that fixing rules also made mistakes, e.g., the precision in FIG. 12(a) is not 100%, which means some changes were not correct. The reason is that, when more errors are from the active domain (e.g., typo rate is 0 in FIG. 12(a)), it will mislead fixing rules to make decisions. For example, consider the two rules in FIG. 3, if the correct (country, capital) values of some tuple are (China, Shanghai) but were changed by using values from the active domain to (Canada, Toronto), using fixing rules will make mistakes.

Recall.

In order to better understand the behaviour of these algorithms, FIGS. 12(b) and 12(f) show the recall corresponding to FIGS. 12(a) and 12(e), respectively. Not surprisingly, our algorithm did not outperform existing approaches in terms of recall. This is because heuristic approaches would repair some potentially erroneous values, but at the trade-off of decreasing precision. Although our method was relatively low in recall, we did our best to ensure the precision, instead of repairing as more errors as possible. Hence, when recall is a major requirement for some system, existing heuristic methods can be used after fixing rules being applied, to compute a consistent database.

FIG. 12(f) shows that the recall is very low (below 8%) for all methods. The reason is that, the UIS dataset generated has few repeated patterns w.r.t. each FD. When noise was introduced, many errors cannot be detected, hence no method can repair them. Note, however, that recall can be improved by learning more rules, as discussed below.

(b) Varying the Number of Fixing Rules.

We studied the accuracy of our repairing algorithms by varying the number of fixing rules. We fixed noise rate at 10% and half of them are typos. For HOSP, we varied the number of rules from 100 to 1000, and reported the recall and precision in FIG. 12(c) and FIG. 12(d), respectively. For UIS, we varied the number of rules from 10 to 100, and reported the results in FIG. 12(g) and FIG. 12(h), respectively. For Heu and Csm, as the typo rate was fixed, their precision and recall values were horizontal lines.

The experimental results indicate that when more fixing rules are available, our approach can achieve better recall, while keeping a good precision, as expected.

(c) Number of Tuples Corrected.

To further understand fixing rules, we next study how many errors each fixing rule can repair. We used the real-life data, i.e., HOSP, and calculated the number of errors that can be correctly repaired by each rule. FIG. 10(a) plotted the top 100 rules with the highest numbers. For each point, its x-coordinate corresponds to a rule, and its y-axis the number of errors corrected by this rule.

We see that a fixing rule can be used to repair multiple errors (e.g., 52 errors for the top left point), which shows its potential to be reused by other datasets in the same domain.

Exp-3: Efficiency of Repairing Algorithms.

In this last set of experiments, we study the efficiency of our data repairing algorithms. As they are linear in data size, we only evaluated their efficiency by varying the number of rules.

The results for HOSP and UIS are given in FIG. 13(a) and FIG. 13(b), respectively. In both figures, the x-axis is for the number of rules and the y-axis is for running time. These two figures show that algorithm IRepair is more efficient. For example, it ran in less than 2 seconds to repair 115K tuples, using 1000 rules (the bottom right node in FIG. 13(a)). In FIG. 13(b), cRepair was faster only when the number of rules was very small (i.e., 10), where the reason is that the extra overhead of using inverted lists and hash counters. However, in general, IRepair was much faster, since it only examined the rules that can be used instead of checking all rules.

Summary.

We find the followings from the above experiments. (a) It is efficient to detect whether a set of fixing rules is consistent (Exp-1). (b) Data repairing using fixing rules is dependable, i.e., they repair data errors with high precision (Exp-2). (c) The recall of using fixing rules can be improved when more fixing rules are available (Exp-2). (d) It is efficient to repair data via fixing rules, which reveals its potential to be used for large datasets (Exp-3).

We have proposed a novel class of data cleaning rules, namely, fixing rules, that (1) compared with data dependencies used in data cleaning, are able to find dependable fixes for input tuples, without using heuristic solutions; and (2) differ from editing rules, are able to repair data automatically without any user involvement. We have identified fundamental problems for deciding whether a set of fixing rules is consistent or redundant, and established their complexity bounds. We have proposed efficient algorithms for checking consistency, and discussed strategies to resolve inconsistent fixing rules. We have also presented dependable data repairing algorithms by capitalizing on fixing rules. Our experimental results with real-life and synthetic data have verified the effectiveness and efficiency of the proposed rules and the presented algorithms. These yield a promising method for automated and dependable data repairing.

When used in this specification and claims, the terms "comprises" and "comprising" and variations thereof mean that the specified features, steps or integers are included. The terms are not to be interpreted to exclude the presence of other features, steps or components.

TECHNIQUES FOR IMPLEMENTING ASPECTS OF EMBODIMENTS OF THE INVENTION

[1] S. Abiteboul, R. Hull, and V. Vianu. *Foundations of Databases*. Addison-Wesley, 1995.
[2] M. Arenas, L. E. Bertossi, and J. Chomicki. Consistent query answers in inconsistent databases. TPLP, 3(4-5), 2003.
[3] C. Batini and M. Scannapieco. *Data Quality: Concepts, Methodologies and Techniques*. Springer, 2006.
[4] L. E. Bertossi, S. Kolahi, and L. V. S. Lakshmanan. Data cleaning and query answering with matching dependencies and matching functions. In *ICDT*, 2011.
[5] G. Beskales, I. F. Ilyas, and L. Golab. Sampling the repairs of functional dependency violations under hard constraints. PVLDB, 3(1), 2010.
[6] G. Beskales, M. A. Soliman, I. F. Ilyas, and S. Ben-David. Modeling and querying possible repairs in duplicate detection. In *VLDB*, 2009.
[7] P. Bohannon, W. Fan, M. Flaster, and R. Rastogi. A cost-based model and effective heuristic for repairing constraints by value modification. In *SIGMOD*, 2005.
[8] L. Bravo, W. Fan, and S. Ma. Extending dependencies with conditions. In *VLDB*, 2007.
[9] J. Chomicki and J. Marcinkowski. Minimal-change integrity maintenance using tuple deletions. *Inf. Comput.*, 197(1-2), 2005.
[10] X. Chu, P. Papotti, and I. Ilyas. Holistic data cleaning: Put violations into context. In *ICDE*, 2013.
[11] G. Cong, W. Fan, F. Geerts, X. Jia, and S. Ma. Improving data quality: Consistency and accuracy. In *VLDB*, 2007.
[12] W. Fan. Dependencies revisited for improving data quality. In *PODS*, 2008.
[13] W. Fan, F. Geerts, X. Jia, and A. Kementsietsidis. Conditional functional dependencies for capturing data inconsistencies. TODS, 33(2), 2008.
[14] W. Fan, X. Jia, J. Li, and S. Ma. Reasoning about record matching rules. PVLDB, 2(1), 2009.
[15] W. Fan, J. Li, S. Ma, N. Tang, and W. Yu. Interaction between record matching and data repairing. In *SIGMOD*, 2011.
[16] W. Fan, J. Li, S. Ma, N. Tang, and W. Yu. Towards certain fixes with editing rules and master data. *VLDB J.*, 21(2), 2012.
[17] I. Fellegi and D. Holt. A systematic approach to automatic edit and imputation. *J. American Statistical Association*, 71(353), 1976.
[18] F. Geerts, G. Mecca, P. Papotti, and D. Santoro. The llunatic data-cleaning framework. PVLDB, 6(9), 2013.
[19] T. N. Herzog, F. J. Scheuren, and W. E. Winkler. *Data Quality and Record Linkage Techniques*. Springer, 2009.
[20] S. Kolahi and L. Lakshmanan. On approximating optimum repairs for functional dependency violations. In *ICDT*, 2009.
[21] C. Mayfield, J. Neville, and S. Prabhakar. ERACER: a database approach for statistical inference and data cleaning. In *SIGMOD*, 2010.
[22] F. Naumann, A. Bilke, J. Bleiholder, and M. Weis. Data fusion in three steps: Resolving schema, tuple, and value inconsistencies. *IEEE Data Eng. Bull.*, 29(2), 2006.
[23] C. H. Papadimitriou. *Computational Complexity*. Addison Wesley, 1994.
[24] V. Raman and J. M. Hellerstein. Potter's Wheel: An interactive data cleaning system. In *VLDB*, 2001.
[25] R. Singh and S. Gulwani. Learning semantic string transformations from examples. PVLDB, 5(8), 2012.
[26] J. Wijsen. Database repairing using updates. TODS, 30(3), 2005.
[27] M. Yakout, A. K. Elmagarmid, J. Neville, M. Ouzzani, and I. F. Ilyas. Guided data repair. PVLDB, 4(5), 2011.

The invention claimed is:

1. A computer-implemented method for cleaning data stored in a database, the method comprising:
providing a data fixing rule to capture an error, the data fixing rule incorporating:
a first set of attributes and respective first set of attribute values;
a second attribute and respective second set of attribute values, wherein the second set of attribute values are erroneous values; and
a correct value;
applying the data fixing rule to the database to capture the error, wherein the error is captured when the first set of attributes and attribute values, and the second attribute and at least one of the erroneous values of the second attribute match a record in the database; and
replacing the at least one erroneous value in the record with the correct value.

2. The method of claim 1, further comprising applying a plurality of the data fixing rules to the tuples stored in the database, the method applying each data fixing rule only once to a respective tuple.

3. The method of claim 1, further comprising:
applying a plurality of the data fixing rules to the tuples stored in the database;
applying each data fixing rule only once to a respective tuple; and
allocating an attribute to each tuple which indicates each data fixing rule that has been applied to the tuple.

4. The method of claim 3, further comprising:
applying a plurality of the data fixing rules to the tuples stored in the database;
applying each data fixing rule only once to a respective tuple;
allocating an attribute to each tuple which indicates each data fixing rule that has been applied to the tuple; and
incrementing at least one hash counter to record when a data fixing rule is applied to a tuple.

5. The method of claim 1, further comprising generating an inverted list of a plurality of data fixing rules, the inverted list comprising the plurality of data fixing rules indexed according to at least one attribute value of each respective data fixing rule.

6. The method of claim 1, further comprising generating an inverted list of a plurality of data fixing rules only once, the inverted list comprising the plurality of data fixing rules indexed according to at least one attribute value of each respective data fixing rule.

7. The method of claim 1, wherein the data fixing rule comprises at least one similarity operator which is operable to detect variants of the first set and second set of attribute values in the database.

8. The method of claim 1, wherein the data fixing rule is operable to use a wildcard attribute value in the first set and second set of attribute values.

9. The method of claim 1, wherein the data fixing rule is operable to detect the negation of an attribute value.

10. The method of claim 1, further comprising providing a plurality of data fixing rules and applying at least one of the plurality of data fixing rules to the database.

11. A system for cleaning data stored in a database, the system comprising a processor configured to:
provide a data fixing rule to capture an error, the data fixing rule incorporating:
a first set of attributes and respective first set of attribute values;
a second attribute and respective second set of attribute values, wherein the second set of attribute values are erroneous values; and
a correct value;
applying the data fixing rule to the database to capture the error, wherein the error is captured when the first set of attributes and attribute values, and the second attribute and at least one of the erroneous values of the second attribute match a record in the database; and
replacing the at least one erroneous value in the record with the correct value.

12. A non-transitory tangible computer readable storage medium comprising instructions for performing a process to be executed on a computer, the process comprising:
providing a data fixing rule to capture an error, the data fixing rule incorporating:
a first set of attributes and respective first set of attribute values;
a second attribute and respective second set of attribute values, wherein the second set of attribute values are erroneous values; and
a correct value;
applying the data fixing rules to the database to capture the error, wherein the error is captured when the first set of attributes and attribute values, and the second attribute and at least one of the erroneous values of the second attribute match a record in the database; and
replacing the at least one erroneous value in the record with the correct value.

* * * * *